(12) United States Patent
Seki

(10) Patent No.: US 11,362,572 B2
(45) Date of Patent: Jun. 14, 2022

(54) ELECTRONIC BOARD, IN-VEHICLE ELECTRIC MOTOR AND ELECTRIC PUMP

(71) Applicant: NIDEC TOSOK CORPORATION, Kanagawa (JP)

(72) Inventor: Yusaku Seki, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 76 days.

(21) Appl. No.: 16/997,895

(22) Filed: Aug. 19, 2020

(65) Prior Publication Data
US 2021/0067011 A1    Mar. 4, 2021

(30) Foreign Application Priority Data

Aug. 30, 2019    (JP) .............................. JP2019-157858

(51) Int. Cl.
| | | |
|---|---|---|
| *H02K 11/33* | (2016.01) | |
| *F04B 49/06* | (2006.01) | |
| *F04B 15/02* | (2006.01) | |
| *F04B 17/03* | (2006.01) | |

(52) U.S. Cl.
CPC .............. *H02K 11/33* (2016.01); *F04B 15/02* (2013.01); *F04B 17/03* (2013.01); *F04B 49/06* (2013.01); *H02K 2211/03* (2013.01)

(58) Field of Classification Search
CPC ..... H02K 11/33; H02K 2211/03; F04B 15/02; F04B 17/03; F04B 49/06
See application file for complete search history.

(56) References Cited

U.S. PATENT DOCUMENTS

| | | | | |
|---|---|---|---|---|
| 8,081,472 | B2 * | 12/2011 | Tokuyama | ................ H01G 2/08 361/716 |
| 2010/0136390 | A1 * | 6/2010 | Ueda | .................. H01M 10/441 429/61 |
| 2014/0037472 | A1 * | 2/2014 | Hibi | ........................ F04B 17/03 417/410.1 |
| 2019/0128207 | A1 * | 5/2019 | Blackman | ................. H02P 5/46 |
| 2021/0313919 | A1 * | 10/2021 | Takahashi | ............... H02P 29/50 |

FOREIGN PATENT DOCUMENTS

JP        2011083061        4/2011

* cited by examiner

*Primary Examiner* — Patrick Hamo
(74) *Attorney, Agent, or Firm* — JCIPRNET

(57) ABSTRACT

An electronic board includes a board, and includes on the board: a power input part inputting power output from an in-vehicle power supply; a drive circuit driving a drive source; a controller controlling driving of the drive source performed by the drive circuit; and a drive command signal input part inputting a drive command signal transmitted from outside. The electronic board further includes on the board: a drive command signal detection circuit capable of detecting the drive command signal, and controlling whether to supply the power input to the power input part to the controller based on whether the drive command signal is detected; and a voltage varying part varying a voltage from the power input part and outputting a varied voltage to the drive command signal detection circuit.

6 Claims, 8 Drawing Sheets

ELECTRONIC BOARD, IN-VEHICLE ELECTRIC MOTOR AND ELECTRIC PUMP

CROSS-REFERENCE TO RELATED APPLICATIONS

The present invention claims priority under 35 U.S.C. § 119 to Japanese Application No. 2019-157858, filed on Aug. 30, 2019, the entire content of which is incorporated herein by reference.

FIELD OF THE INVENTION

The present disclosure relates to an electronic board, and an in-vehicle electric motor and an electric pump including the electronic board.

BACKGROUND

A conventional electronic board is known, which includes a board and includes a power input part, a drive circuit, a controller, and a drive command signal input part on the board. The power input part inputs power output from an in-vehicle power supply. The drive circuit is provided for driving a drive source. The controller controls the driving of the drive source performed by the drive circuit. The drive command signal input part inputs a drive command signal.

For example, a conventional motor control device includes a driver circuit as such an electronic board. The driver circuit includes on a board a terminal as the power input part that inputs power output from a battery, a driver IC (Integrated Circuit) as the drive circuit for driving a brushless motor serving as the drive source, a CPU (Central Processing Unit) serving as the controller, and a terminal as the drive command signal input part. A relay is electrically interposed between the power input terminal in the driver circuit having such a configuration and the battery serving as the in-vehicle power supply. An ECU (Engine Control Unit) mounted on a vehicle outputs an output duty instruction signal as the drive command signal to the CPU via the drive command signal input terminal of the driver circuit. When the CPU of the driver circuit outputs a PWM (Pulse Width Modulation) signal to the driver IC based on the output duty command signal, the driver IC applies a current to U, V, and W coils of the brushless motor via a switching element to drive the brushless motor. When not driving a vehicle electrical component, the ECU mounted on the vehicle stops the power supply from the battery to the power input terminal of the driver circuit by turning off output of a voltage to a coil of a relay circuit.

According to the above, with the motor control device having such a configuration, it is possible to prevent a dark current from flowing from the battery to a ground via the driver circuit and reduce the generation of the dark current when the vehicle electrical component is not driven.

However, in the motor control device described above, the relay is provided between the battery in the vehicle and the driver circuit, so the layout flexibility of the vehicle is reduced and the cost is increased. In addition, the devices on the electronic board may be damaged by a high voltage surge generated by the relay.

SUMMARY

According to an exemplary embodiment of the present disclosure, an electronic board includes a board, and includes on the board: a power input part inputting power output from an in-vehicle power supply; a drive circuit driving a drive source; a controller controlling driving of the drive source performed by the drive circuit; and a drive command signal input part inputting a drive command signal transmitted from outside. The electronic board further includes on the board: a drive command signal detection circuit capable of detecting the drive command signal, and controlling whether to supply the power input to the power input part to the controller based on whether the drive command signal is detected; and a voltage varying part varying a voltage from the power input part and outputting a varied voltage to the drive command signal detection circuit.

The above and other elements, features, steps, characteristics and advantages of the present disclosure will become more apparent from the following detailed description of the preferred embodiments with reference to the attached drawings.

DETAILED DESCRIPTION

Figure 1:
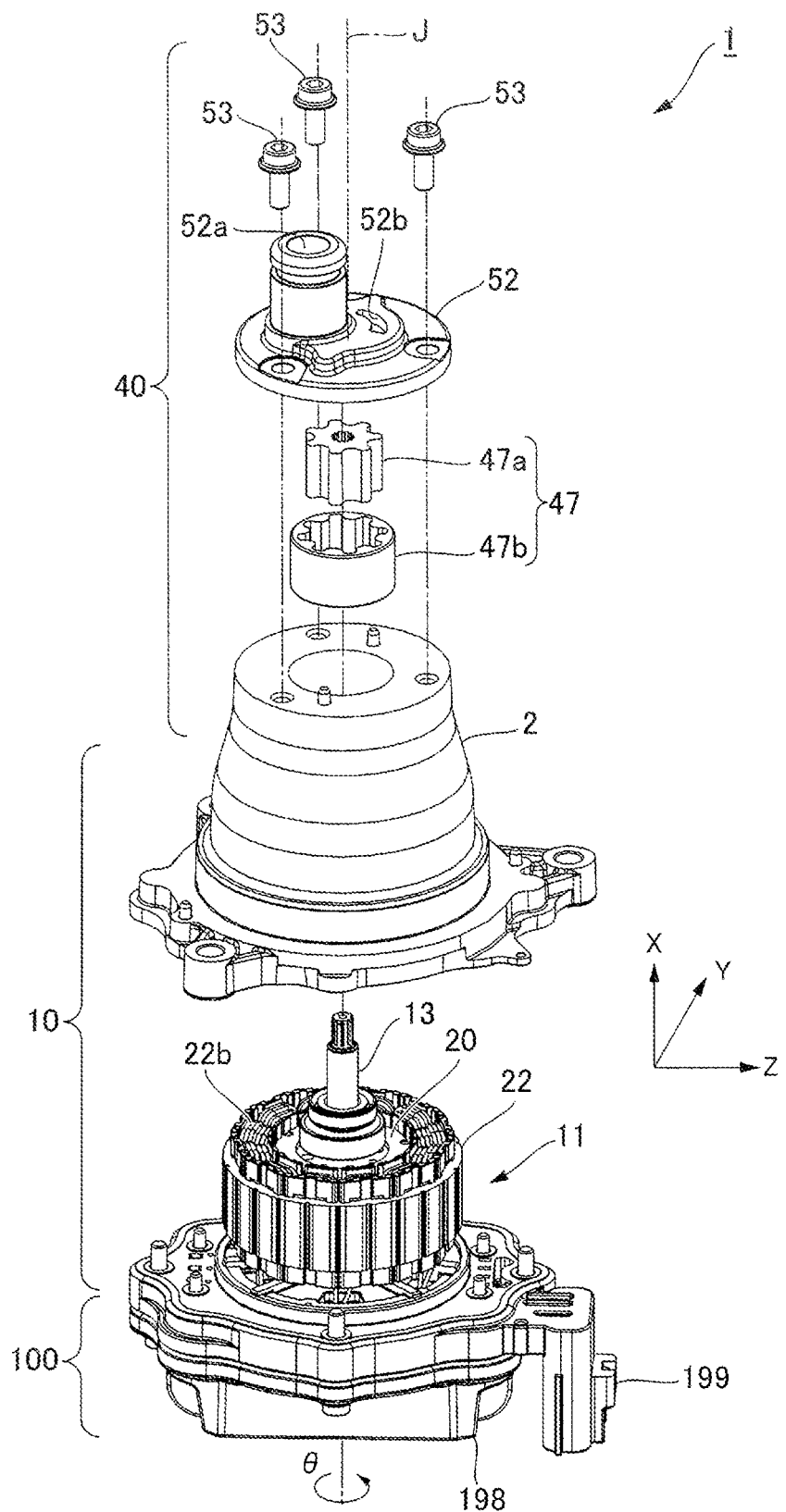
FIG. 1 is an exploded perspective view showing an electric oil pump according to an exemplary embodiment from the +X side.

Hereinafter, an electric oil pump according to an exemplary embodiment of the present disclosure will be described with reference to the drawings. In the present exemplary embodiment, an electric oil pump mounted on a vehicle such as an automobile will be described. Further, in the following drawings, the scale and number of the structures may be different from those of the actual structures to make the structures easy to understand.

In addition, in the drawings, an XYZ coordinate system is shown appropriately as a three-dimensional orthogonal coordinate system. In the XYZ coordinate system, the X-axis direction is a direction parallel to the axial direction of a center axis J shown in FIG. 1. The center axis J is a center axis line of a shaft (motor shaft) 13 of a motor part 10 which will be described later. The Y-axis direction is a direction parallel to the transverse direction of the electric oil pump shown in FIG. 1. The Z-axis direction is a direction orthogonal to both the X-axis direction and the Y-axis direction. In any of the X-axis direction, the Y-axis direction, and the Z-axis direction, the side on which the arrow shown in the drawings points is the +side, and the opposite side is the −side.

In the following description, the positive side (+X side) in the X-axis direction is referred to as "front side", and the negative side (−X side) in the X-axis direction is referred to as "rear side". Nevertheless, the terms "front side" and "rear side" are simply names used for description, and are not intended to limit the actual positional relationship and direction. In the present disclosure, the front side (+X side) corresponds to one side, and the rear side (−X side) corresponds to the other side. Unless otherwise specified, the direction parallel to the center axis J (X-axis direction) is simply referred to as "axial direction", the radial direction centered on the center axis J is simply referred to as "radial direction", and the circumferential direction centered on the center axis J, that is, around the axis of the center axis J (A direction), is simply referred to as "circumferential direction".

In this specification, the phrase "extending in the axial direction" includes not only a case of extending strictly in the axial direction (X-axis direction), but also a case of extending in a direction inclined by less than 45° with respect to the axial direction. Further, in this specification, the phrase "extending in the radial direction" includes not only a case of extending strictly in the radial direction, that is, a direction perpendicular to the axial direction (X-axis direction), but also a case of extending in a direction inclined by less than 45° with respect to the radial direction.

Figure 2:
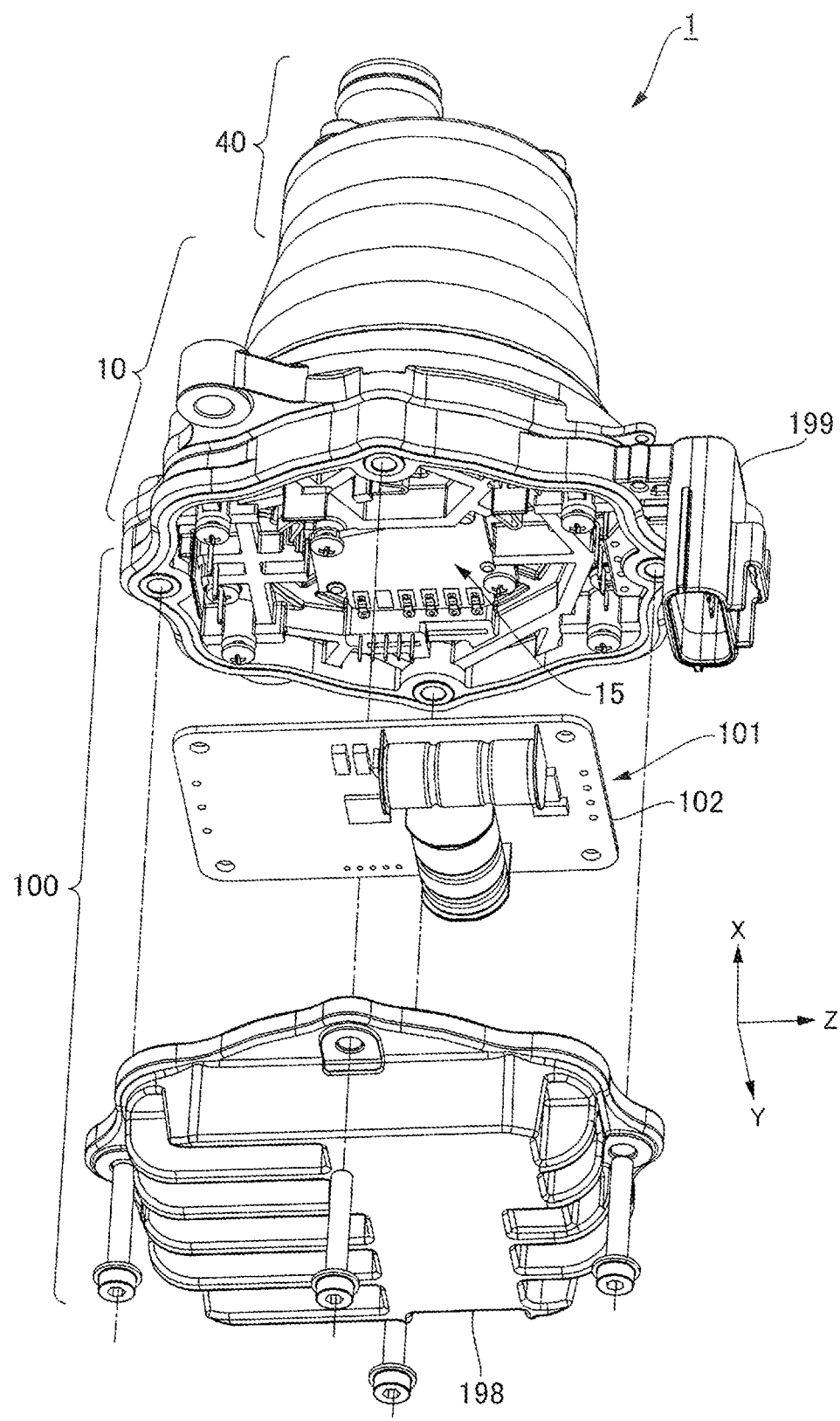
FIG. 2 is an exploded perspective view showing the electric oil pump from the −X side.

FIG. 1 is an exploded perspective view showing the electric oil pump 1 according to an exemplary embodiment from the +X side. FIG. 2 is an exploded perspective view showing the electric oil pump 1 from the −X side. The electric oil pump 1 includes a housing 2, a motor part 10, a pump part 40, and an inverter 100, as shown in FIG. 1 and FIG. 2.

The housing 2 is a casting made of a metal (for example, aluminum). The housing 2 also serves as a motor housing for the motor part 10, a pump housing for the pump part 40, and an inverter housing for the inverter 100. The motor housing of the motor part 10, the pump housing of the pump part 40, and the inverter housing of the inverter 100 are portions of a single member.

The pump part 40 includes a pump rotor 47 accommodated in a rotor accommodating part of the housing 2. The rotor accommodating part of the pump part 40 and the motor housing of the motor part 10 may be portions of a single member or separate bodies. Furthermore, the motor housing of the motor part 10 and the pump housing of the pump part 40 may be separate bodies.

When the motor housing and the pump housing are portions of a single member as in the electric oil pump 1 according to the exemplary embodiment, the boundary between the motor housing and the pump housing in the axial direction is defined as follows. That is, the axial center of a wall provided with a through hole, which allows a shaft 13 to pass through from inside the motor housing toward the rotor accommodating part of the pump housing, is the boundary between the two housings in the axial direction.

The motor part 10 includes a motor 11 in the motor housing.

The motor 11 includes the shaft 13 arranged along the center axis J extending in the axial direction, a rotation angle sensor 15, a rotor 20, and a stator 22. The rotation angle sensor 15 is shown only in FIG. 2 among FIG. 1 and FIG. 2. In addition, the rotor 20 and the stator 22 are shown only in FIG. 1 among FIG. 1 and FIG. 2.

The motor 11 is, for example, an inner rotor type motor. The rotor 20 is fixed to the outer peripheral surface of the shaft 13, and the stator 22 is arranged on the radially outer side the rotor 20. The portion of the motor 11, excluding the shaft 13, is the main body of the motor 11. That is, the main body of the motor 11 is defined by the rotor 20, the stator 22, the rotation angle sensor 15, etc.

The rotor 20 is fixed to a region on the rear side (the other side) with respect to the axial center of the shaft 13 and to a region on the front side (one side) with respect to the end on the rear side. The stator 22 is arranged with the inner peripheral surface facing the outer peripheral surface of the rotor 20.

The axially front side of the shaft 13 that serves as the motor shaft protrudes from the end on the front side of the stator 22 to be connected to the pump part 40 (more specifically, the pump rotor 47).

The stator 22 includes a coil 22b. When power is supplied to the coil 22b, the rotor 20 rotates together with the shaft 13.

A sensor magnet (not shown) is fixed to the end on the axially rear side of the shaft 13 and rotates together with the shaft 13. The substantially disc-shaped sensor magnet is bisected into two regions at the position of the diameter, and the magnetic pole in one region is the S pole and the magnetic pole in the other region is the N pole.

The rotation angle sensor 15 is fixed to the end on the rear side of the motor 11. Further, the rotation angle sensor 15 includes a sensor board and a Hall IC mounted on the sensor board. The sensor board is arranged in a position that a board surface of the sensor board extends in the radial direction. The Hall IC includes three Hall elements (not shown) arranged in the circumferential direction and faces the sensor magnet in the axial direction. When the sensor magnet rotates together with the shaft 13, the magnetic forces of the S pole and the N pole respectively detected by the three Hall elements of the Hall IC change individually. Each of the three Hall elements outputs a Hall signal according to the detected magnetic force. A microcomputer, which will be described later, of the inverter 100 specifies the rotation angle of the shaft 13 based on a first Hall signal H1, a second Hall signal H2, and a third Hall signal H3 transmitted from the Hall IC.

The housing 2 has an opening facing the axially rear side at the end on the rear side in the axial direction. An inverter cover 198, which will be described later, of the inverter 100 is fixed to the housing 2 and closes the above-described opening. By removing the inverter cover 198 from the housing 2, an operator is able to access an electronic board 101, which will be described later, in the inverter 100 and the rotation angle sensor 15 of the motor 11.

The pump part 40 is located on the axially front side of the motor part 10, and is driven by the motor part 10 via the shaft 13 to discharge oil. The pump part 40 includes the pump rotor 47 and a pump cover 52.

The pump rotor 47 is attached to the front side of the shaft 13. The pump rotor 47 includes an inner rotor 47a and an outer rotor 47b. The inner rotor 47a is fixed to the shaft 13. The outer rotor 47b surrounds the radially outer side of the inner rotor 47a.

The inner rotor 47a has an annular shape or a substantially annular shape. The inner rotor 47a is a gear having teeth on the radially outer side surface. The inner rotor 47a rotates around the axis (θ direction) together with the shaft 13. The outer rotor 47b has an annular shape or a substantially annular shape surrounding the radially outer side of the inner rotor 47a. The outer rotor 47b is a gear having teeth on the radially inner side surface. The radially outer side surface of the outer rotor 47b is circular or substantially circular.

The gear on the radially outer side surface of the inner rotor 47a and the gear on the radially inner side surface of the outer rotor 47b mesh with each other, and as the inner rotor 47a rotates with the rotation of the shaft 13, the outer rotor 47b rotates. That is, the rotation of the shaft 13 causes the pump rotor 47 to rotate. The motor part 10 and the pump part 40 are provided with the shaft 13 as a motor shaft defined by the same member. Thereby, the size of the electric oil pump 1 in the axial direction is prevented from increasing.

As the inner rotor 47a and the outer rotor 47b rotate, the volume between the meshing portions of the inner rotor 47a and the outer rotor 47b changes. The region where the volume decreases is the pressurization region, and the region where the volume increases is a negative pressure region.

The housing 2 has an opening, facing the axially front side, at the end on the axially front side. This opening is closed by the pump cover 52. The pump cover 52 is fixed to the housing 2 by bolts 53.

In the pump cover 52, a suction port 52a for sucking oil from the outside is provided at a position facing the negative pressure region of the pump rotor 47. Further, in the pump cover 52, a discharge port 52b for discharging oil in the pump part 40 to the outside is provided at a position facing the pressurization region of the pump rotor 47. As the pump rotor 47 rotates, the oil from the outside is sucked into the pump part 40 via the suction port 52a, and the oil in the pump part 40 is discharged to the outside via the discharge port 52b.

The inverter 100 is arranged on the −X side in the axial direction with respect to the pump part 40 and the motor part 10. The inverter 100 that controls the driving of the motor 11 includes the electronic board 101, the inverter cover 198, and a connector 199.

The electronic board 101 includes a board 102 and a plurality of electronic components mounted on the board 102. The board 102 includes a plurality of board wirings, terminals, lands, through holes, test points, etc. The electronic board 101 is the board 102 having such a configuration and having a plurality of electronic components mounted thereon. That is, the board 102 is a portion of the electronic board 101 with the electronic components mounted on the electronic board 101 removed from the electronic board 101. Part of the plurality of electronic components mounted on the board 102 define a motor drive circuit having an inverter function.

Figure 3:
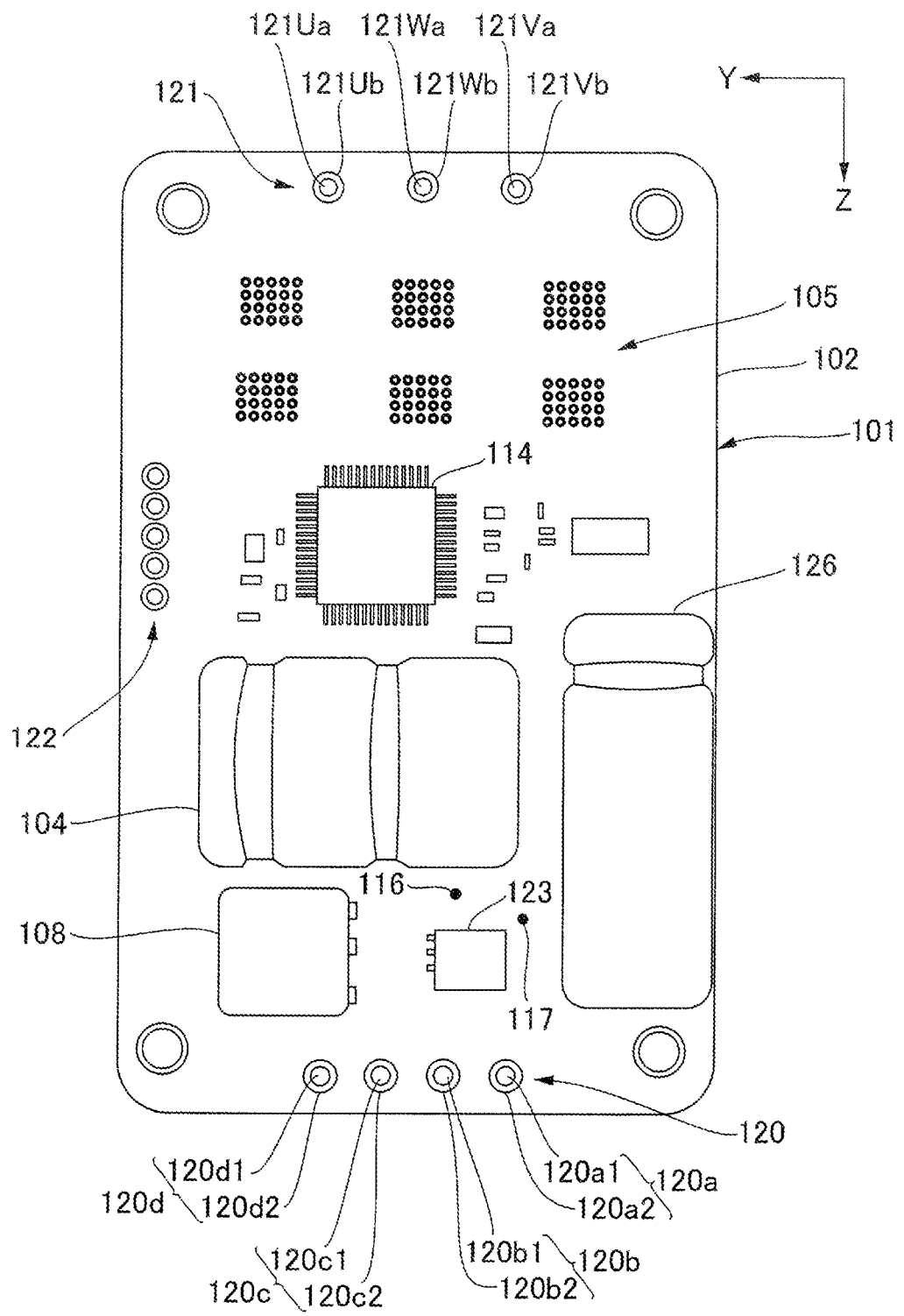
FIG. 3 is a plan view showing a first surface of an electronic board of the electric oil pump.

FIG. 3 is a plan view showing a first surface of the electronic board 101. The power input part 120 is provided at the end on the +Z side in the Z-axis direction of the board 102 of the electronic board 101. The power input part 120 includes four terminals defined by through holes and lands. The first terminal is a positive electrode terminal 120a defined by a through hole 120a1 and a land 120a2 for a constant power supply (+B). The second terminal is a signal input terminal 120b serving as a drive command signal input part that inputs a drive command signal defined by PWM output from the ECU of the vehicle. The signal input terminal 120b is a terminal defined by a through hole 120b1 and a land 120b2. The third terminal is a signal output terminal 120c defined by a through hole 120c1 and a land 120c2. A microcomputer 114 calculates the rotation speed (rotation frequency) of the motor 11 (rotor 20) based on the first Hall signal H1, the second Hall signal H2, and the third Hall signal H3 transmitted from the rotation angle sensor 15 of the motor part 10, and outputs the calculation result as a rotation speed signal. The output rotation speed signal is input to the ECU 900 of the vehicle via a communication interface 111 and the signal output terminal 120c. The fourth terminal in the power input part 120 is a GND terminal defined by a through hole 120d1 and a land 120d2 for GND. Each of the four terminals described above is electrically connected to one of the four connector terminals of the connector 199.

A choke coil 108 is mounted in a region of the board 102 on the −Z side with respect to the power input part 120 and on the +Z side with respect to the first capacitor 104 in the Z-axis direction. Further, a MOSFET (Metal-Oxide-Semiconductor Field-Effect Transistor) 123 that defines a reverse connection protection circuit which will be described later is also mounted in the above-described region.

A second capacitor 126 is mounted on the −Y side in the Y-axis direction of the first capacitor 104 and the MOSFET 123. The second capacitor 126 is an electrolytic capacitor for maintaining the power supply voltage when the power supply is interrupted.

A sensor connection part 122 is provided and the microcomputer 114 is mounted in a region of the board 102 on the −Z side with respect to the second capacitor 126 and the first capacitor 104 in the Z-axis direction. The sensor connection part 122 includes five sets of through holes and lands. The first is a set of a through hole and a land for the first Hall signal H1. The second is a set of a through hole and a land for the second Hall signal H2. The third is a set of a through hole and a land for the third Hall signal H3. The fourth is a set of a through hole and a land for GND. The fifth is a set of a through hole and a land for a 5V power supply. The above-described five sets are arranged side by side in the Z-axis direction at the end on the +Y side in the Y-axis direction of the board 102.

As shown in FIG. 2, the rotation angle sensor 15 of the motor part 10 includes five pin-shaped or substantially pin-shaped terminals extending in the axial direction. Specifically, the five pin-shaped or substantially pin-shaped terminals described above are the terminal for the first Hall signal H1, the terminal for the second Hall signal H2, the terminal for the third Hall signal, the +5V terminal, and the GND terminal. Each of the five pin-shaped or substantially pin-shaped terminals described above is soldered or welded to the through hole and the land while passing through the through hole of any one of the terminals in the sensor connection part 122 of the board 102 of the inverter 100.

As shown in FIG. 3, a motor drive circuit 105 is provided in a region of the board 102 on the −Z side with respect to the microcomputer 114 and the sensor connection part 122 in the Z-axis direction. The motor drive circuit 105 includes six bipolar transistors (MOSFETs).

A motor power output part 121 is arranged at the end on the −Z side in the Z-axis direction of the board 102. The motor power output part 121 includes three sets of through holes and lands. The first is a set of a through hole 121Ua and a land 121Ub for the U phase of a three-phase AC power. The second is a set of a through hole 121Va and a land 121Vb for the V phase. The third is a set of a through hole 121Wa and a land 121Wb for the W phase.

The connector 199 is connected to an external connector provided in the vehicle. The external connector includes four ports for the constant power supply (+B), GND, signal input, and signal output, and is moved from the +X side toward the −X side in the axial direction by the operator to be attached to the connector 199. The connector 199 includes four connector terminals that are electrically connected to the four terminals in the power input part 120 of the board 102.

Figure 4:
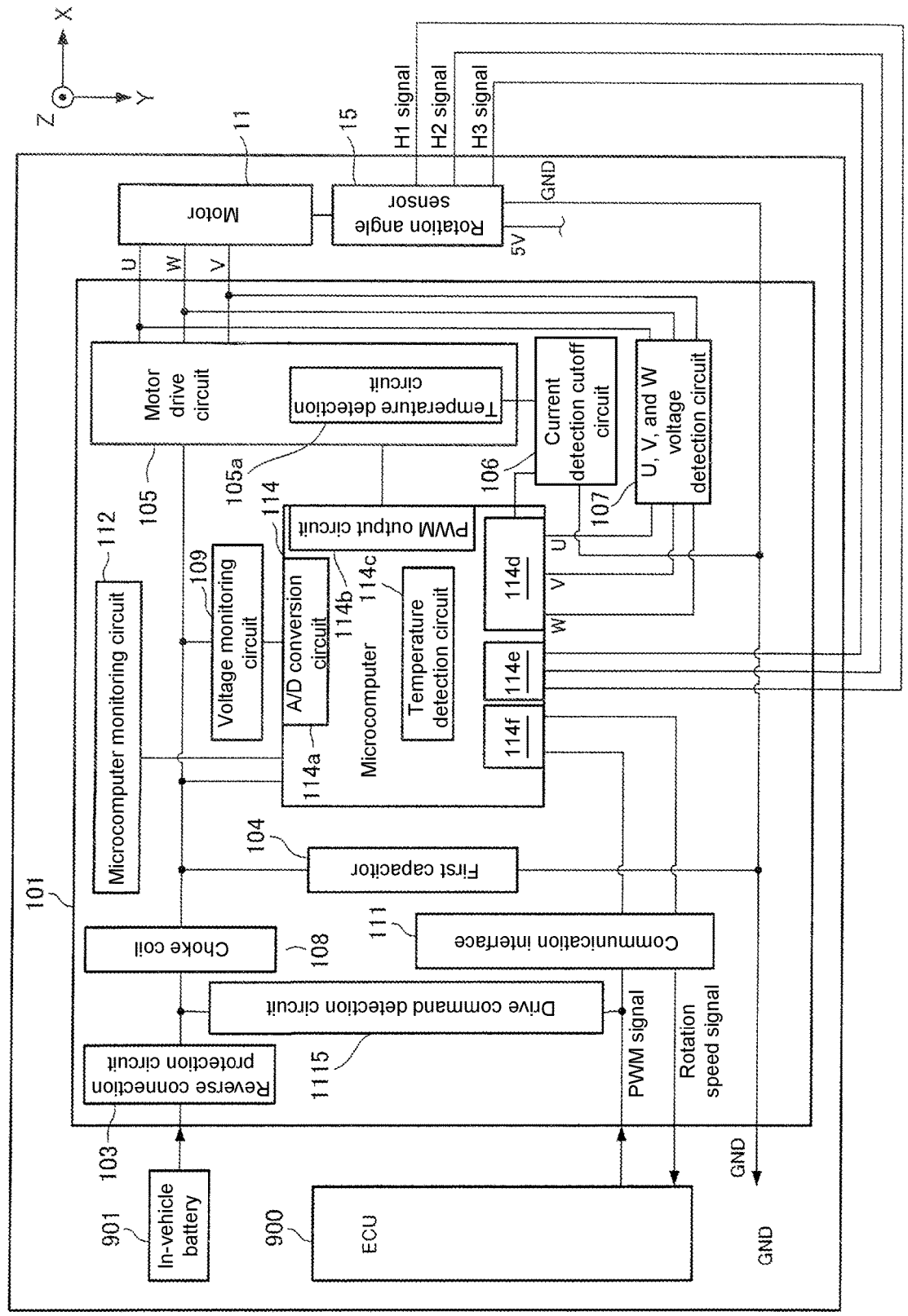
FIG. 4 is a block diagram of a circuit of the electronic board.

FIG. 4 is a block diagram of a circuit of the electronic board 101 of the inverter 100. The electronic board 101 includes a reverse connection protection circuit 103, the first capacitor 104, the motor drive circuit 105, a current detection cutoff circuit 106, a U, V, and W voltage detection circuit 107, the choke coil 108, and a voltage monitoring circuit 109. The electronic board 101 also includes a 5V power supply circuit 141, the communication interface 111, a microcomputer monitoring circuit 112, a power supply voltage monitoring circuit 113, the microcomputer 114, and a drive command detection circuit 115.

The +terminal of an in-vehicle battery 901 is connected to the positive electrode terminal 120a of the power input part 120 of the board 102 shown in FIG. 3. In addition, the −terminal of the in-vehicle battery 901 shown in FIG. 4 is connected to the GND terminal 120d of the power input part 120 of the board 102 shown in FIG. 3. In the electronic board 101, the positive electrode terminal 120a of the power input part 120 is connected to the microcomputer 114 via the reverse connection protection circuit 103 and the choke coil 108 shown in FIG. 4.

When the positive/negative of the in-vehicle battery 901 are connected to the positive electrode terminal 120a and the GND terminal 120d of the board 102 in reverse, the reverse connection protection circuit 103 cuts off the output of the negative voltage to the downstream side of the reverse connection protection circuit 103. Thus, the electronic components mounted on the downstream side of the reverse connection protection circuit 103 are protected.

The first capacitor 104 is an electrolytic capacitor that absorbs the ripple current of the power output from the in-vehicle battery 901 and stabilizes the power supply voltage.

The voltage monitoring circuit 109 detects the DC voltage output to the motor drive circuit 105 and outputs the detected value to an A/D conversion circuit 114a of the microcomputer 114.

The microcomputer 114 includes the A/D conversion circuit 114a, a PWM output circuit 114b, a temperature detection circuit 114c, an A/D conversion circuit 114d, an I/O circuit 114e, and a communication circuit 114f. The microcomputer 114 receives a drive command signal defined by PWM transmitted from the ECU 900 of the vehicle via the communication interface 111 of the electronic board 101 by the communication circuit 114f, and generates a PWM signal for driving the motor 11 to rotate at a frequency based on the drive command signal. The generated PWM signal is output from the PWM output circuit 114b of the microcomputer 114 and is input to the motor drive circuit 105.

The motor drive circuit 105 converts the DC power transmitted from the in-vehicle battery 901 into three-phase AC power having a frequency according to the PWM signal transmitted from the PWM output circuit 114b of the microcomputer 114, and outputs the three-phase AC power to the motor 11. The motor drive circuit 105 includes a plurality of bipolar transistors for switching (MOSFETs), and a temperature detection circuit. The temperature detection circuit of the motor drive circuit 105 outputs the detected temperature value to the current detection cutoff circuit 106.

The current detection cutoff circuit 106 detects the current flowing from the motor drive circuit 105 to the motor 11. When the detected current value exceeds a predetermined upper limit, or when the detected temperature value transmitted from the temperature detection circuit of the motor drive circuit 105 exceeds a predetermined upper limit, the current detection cutoff circuit 106 outputs a cutoff signal to the microcomputer 114.

When the cutoff signal is transmitted from the current detection cutoff circuit 106, or when the temperature value detected by the temperature detection circuit 114c of the microcomputer 114 exceeds a predetermined upper limit, the microcomputer 114 stops the generation of the PWM signal to stop the driving of the motor 11.

The U, V, and W voltage detection circuit 107 detects the voltage of the three-phase AC power output from the motor drive circuit 105 to the motor 11, and outputs the detected value to the A/D conversion circuit 114d of the microcomputer 114.

The drive command detection circuit 115 is connected to a board wiring that electrically connects the reverse connection protection circuit 103 and the choke coil 108. The choke coil 108 defines a circuit for preventing the current flowing through the drive command detection circuit 115 from becoming an overcurrent.

The microcomputer monitoring circuit 112 is connected to the microcomputer 114, and monitors for abnormalities in the microcomputer 114 by communicating with the microcomputer 114.

The voltage monitoring circuit 109 detects the voltage input to the microcomputer 114, and outputs the detected value to the A/D conversion circuit 114a of the microcomputer 114.

The first Hall signal H1, the second Hall signal H2, and the third Hall signal output from the rotation angle sensor 15 are input to the I/O circuit 114e of the microcomputer 114. The microcomputer 114 specifies the rotation angle of the rotor (20 in FIG. 3) of the motor 11 based on the first Hall signal H1, the second Hall signal H2, and the third Hall signal H3, and calculates the rotation frequency of the rotor based on the specified result. The microcomputer 114 outputs the signal of the calculated rotation frequency as a rotation speed signal to the ECU 900 of the vehicle via the communication interface 111.

In the electric oil pump 1 according to the exemplary embodiment, since no relay is provided between the in-vehicle battery 901 and the electronic board 101, the in-vehicle battery 901 and the power input part 120 of the board 102 are electrically connected at all times regardless of whether the electric oil pump 1 is driven. In such a configuration, when the electric oil pump 1 is not driven, a dark current (standby current) may gradually flow from the in-vehicle battery 901 to the electronic board 101, accelerating the discharge of the in-vehicle battery 901. Then, if the vehicle is stopped for a long period of time, the power charged to the in-vehicle battery 901 may be consumed and the vehicle may not be able to be started. If the vehicle is an electric car, it may be necessary to move the vehicle to a place for recharge, which imposes inconvenience upon the user.

On the other hand, according to the conventional motor control device described above, when the brushless motor is not driven, the power supply to the driver circuit is stopped by the relay provided between the battery and the driver circuit, so it is possible to prevent the generation of a dark current. However, in the motor control device, since the relay is provided between the battery in the vehicle and the driver circuit, the layout flexibility of the vehicle is reduced.

Therefore, in the electric oil pump 1 according to the exemplary embodiment, instead of providing a relay between the in-vehicle battery 901 and the electronic board 101, the drive command detection circuit 115 is provided in the electronic board 101 to suppress the generation of a dark current when the electric oil pump 1 is not driven.

Figure 5:
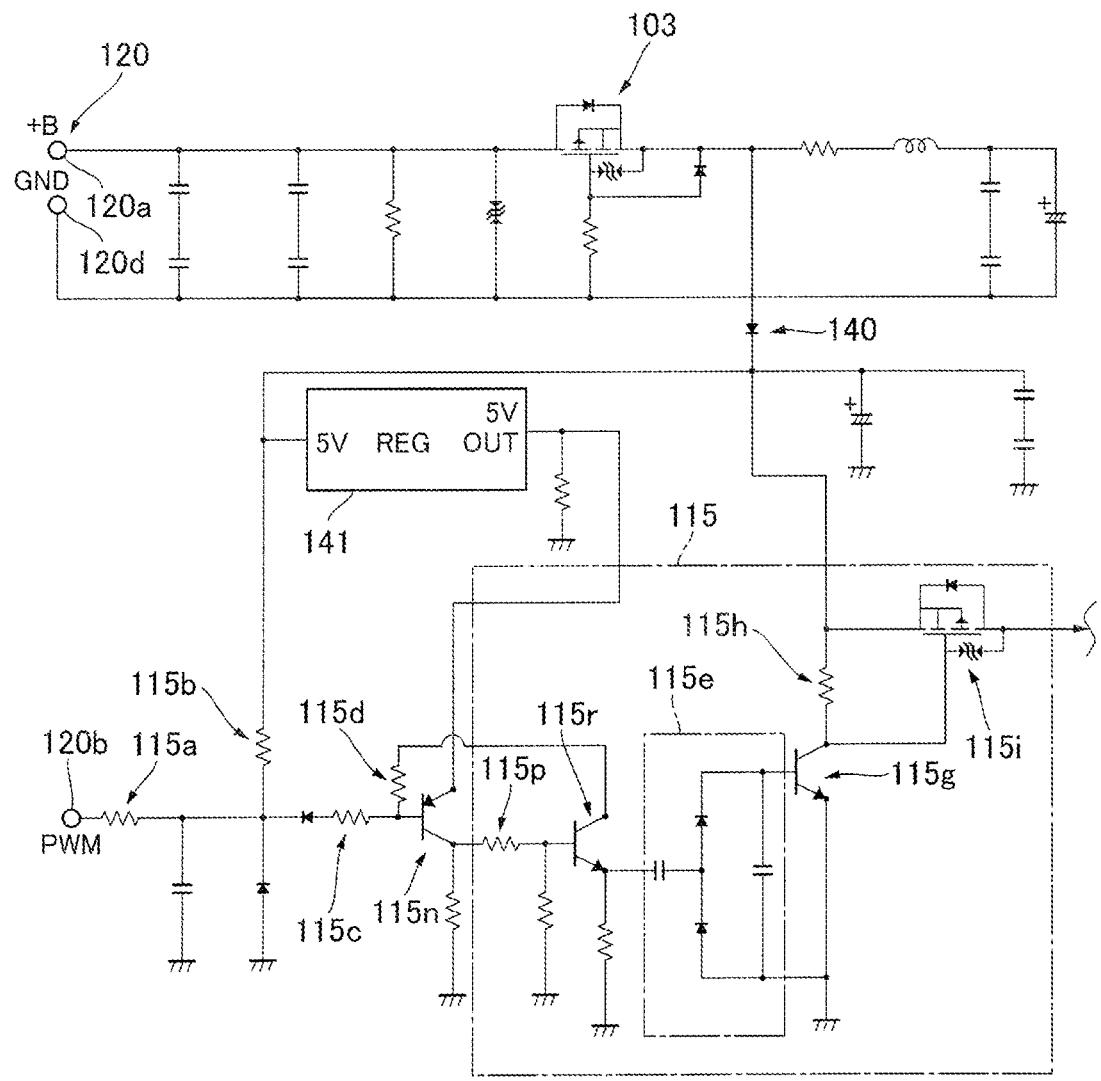
FIG. 5 is a circuit diagram showing a portion of the circuit in the electronic board.

FIG. 5 is a circuit diagram showing a portion of the circuit in the electronic board 101. In the drawing, the reverse connection protection circuit 103 includes a MOSFET (123 in FIG. 3). When a voltage is applied between the positive electrode terminal 120a and the GND terminal 120d of the board 102, a voltage is applied between the source terminal and the gate terminal of the MOSFET of the reverse connection protection circuit 103. As shown in the drawing, a parasitic diode that allows the flow of current from the left side to the right side in the drawing is provided in the MOSFET of the reverse connection protection circuit 103. When the positive/negative of the power supply are connected to the positive electrode terminal 120a and the GND terminal 120d in reverse, the MOSFET of the reverse connection protection circuit 103 does not turn on and cuts off the output of the negative voltage to the downstream side of the reverse connection protection circuit 103. Thus, each circuit in the electronic board 101 is protected.

The electronic board 101 includes a diode 140, a resistor 115a, a resistor 115b, a resistor 115c, a resistor 115d, a first transistor 115n, and the drive command detection circuit 115 in addition to the reverse connection protection circuit 103. In addition, although not shown in FIG. 4 for convenience, the electronic board 101 includes the 5V power supply circuit 141. The source terminal of the MOSFET of the reverse connection protection circuit 103 shown in FIG. 5 is connected to the drive command detection circuit 115 via the diode 140. Further, the above-described source terminal is connected to the 5V power supply circuit 141 via the diode 140. The 5V power supply circuit 141 supplies 5V power to the rotation angle sensor 15 shown in FIG. 4.

In FIG. 5, the power (for example, DC 12V) supplied to the electronic board 101 is transformed (reduced to 5V in the example as shown) by the 5V power supply circuit (regulator) 141, which serves as a voltage varying part, and then is supplied to the drive command detection circuit 115 via the first transistor 115n. The drive command detection circuit 115 functions as a drive command signal detection circuit in the present disclosure.

The drive command detection circuit 115 includes four resistors, a double voltage rectifier circuit 115e, a second transistor 115r, a third transistor 115g, and a MOSFET 115i. The diode 140 is connected to the GND terminal of the ECU 900 via the resistor 115b, the resistor 115a, and the switching element of the ECU 900. The ECU 900 sets the above-described switching element to an off state when the motor 11 is not driven, so that the first transistor 115n of the drive command detection circuit 115 and the GND terminal of the ECU 900 are not connected. Thus, no current flows through the base of the first transistor 115n, so that the state between the collector and emitter of the first transistor 115n is set to a non-conducting state (the switch is turned off).

On the other hand, the ECU 900 turns on and off the above-described switching element when the motor 11 is driven, so as to turn on and off the flow of current passing through the reverse connection protection circuit 103, the diode 140, the resistor 115b, the resistor 115a, the switching element of the ECU 900, and the GND. Thus, the ECU 900 generates a drive command signal defined by PWM. When the drive command signal is generated, a current flows to the base of the first transistor 115n. Then, a current due to the voltage output from the 5V power supply circuit 141 flows to the base of the second transistor 115r via the collector and emitter of the first transistor 115n and the resistor 115p. Then, the signal is input to the double voltage rectifier circuit 115e.

The double voltage rectifier circuit 115e includes two capacitors and two diodes. The signal input to the double voltage rectifier circuit 115e is rectified to a double voltage and then input to the base of the third transistor 115g to electrically connect the collector and the emitter of the third transistor 115g. Then, a current flows between the collector and emitter of the third transistor 115g via the diode 140 and the resistor 115h of the drive command detection circuit 115. At this time, the voltage across two ends due to the current flowing to the resistor 115h is applied between the gate and source of the MOSFET 115i, the MOSFET 115i is turned on, and the voltage is supplied to the microcomputer 114 shown in FIG. 4 from the source of the MOSFET 115i via the drain.

When the drive command signal is not generated by the ECU 900 of the vehicle, the second transistor 115r and the third transistor 115g of the drive command detection circuit 115 are both turned off. Therefore, the gate of the MOSFET 115i and the GND are not connected. Since no voltage is applied to the gate of the MOSFET 115i, power is not supplied to the downstream side of the MOSFET 115i. Thus, in the electric oil pump 1, it is possible to suppress the generation of a dark current without providing the vehicle with a relay that turns on and off the supply of the power output from the in-vehicle battery 901 to the electronic board 101. As described above, according to the electric oil pump 1, it is possible to suppress the generation of a dark current while avoiding a reduction in layout flexibility of the vehicle caused by providing a relay in the vehicle.

Further, the drive command signal generated by the ECU 900 is input to the drive command detection circuit 115 and also to the microcomputer 114 via a board wiring (not shown).

Figure 6:
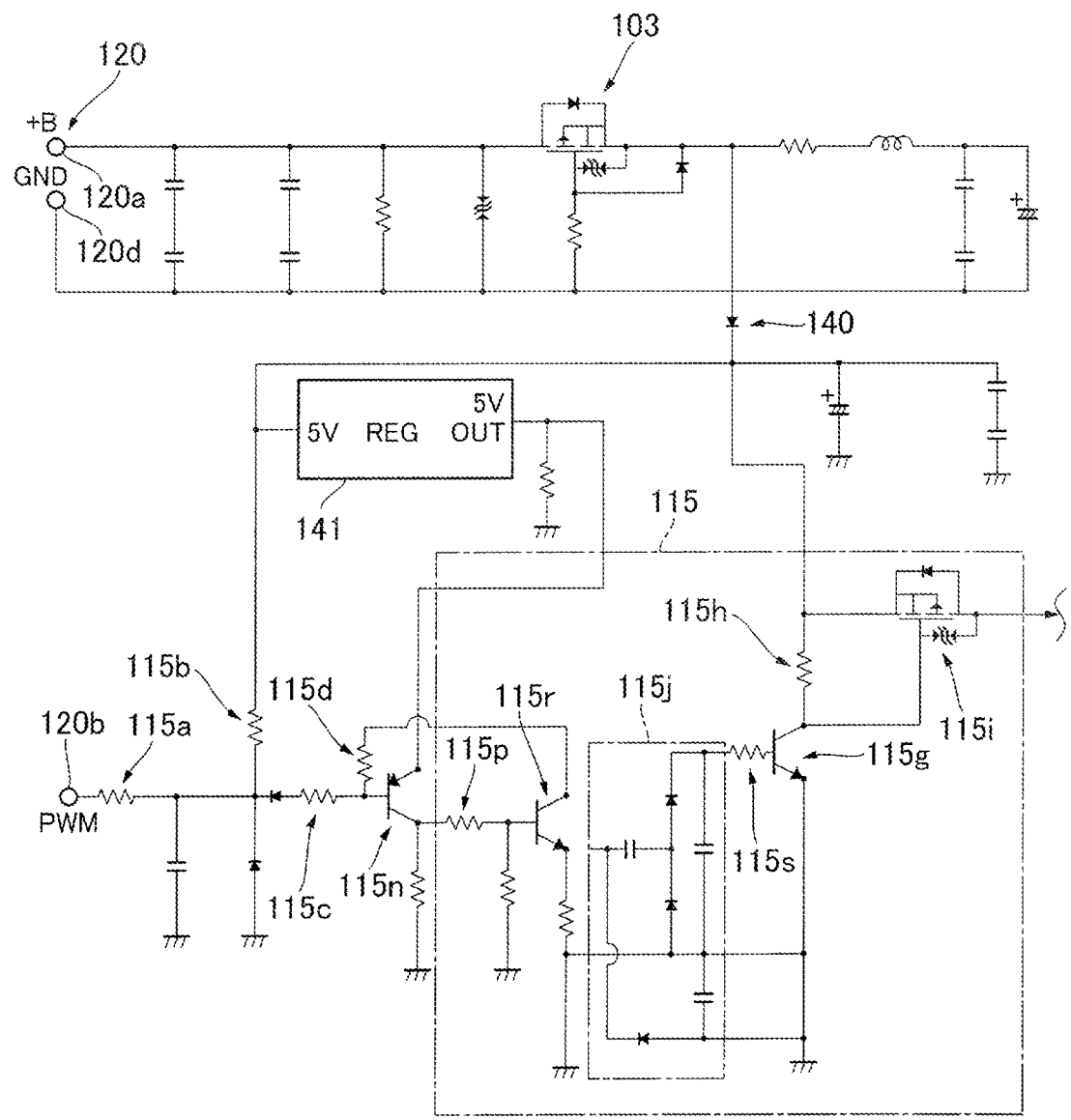
FIG. 6 is a circuit diagram showing a portion of the circuit in the electronic board of the electric oil pump according to the first modified example.

The above illustrates the drive command detection circuit 115 having a configuration that rectifies the drive command signal defined by PWM having a duty corresponding to the drive frequency of the motor 11 to a double voltage by the double voltage rectifier circuit 115e and supplies the double voltage to the base of the first transistor 115n. However, the voltage is not necessarily doubled. For example, as shown in FIG. 6, the drive command signal may be rectified to a triple voltage by a triple voltage rectifier circuit 115j and supplied to the base of the first transistor 115n. The triple voltage rectifier circuit 115j shown in FIG. 6 includes three capacitors and three diodes.

Figure 7:
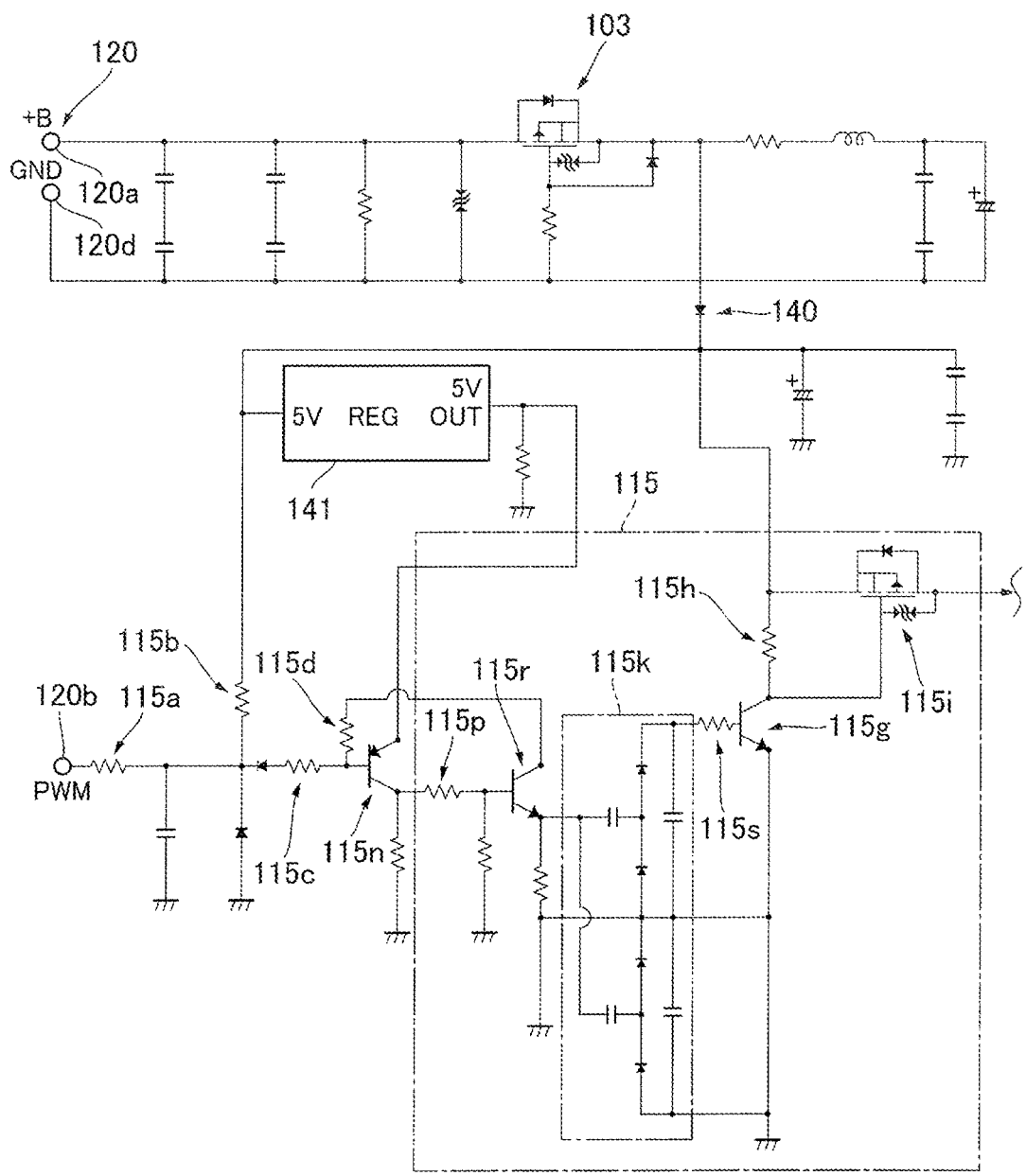
FIG. 7 is a circuit diagram showing a portion of the circuit in the electronic board of the electric oil pump according to the second modified example.

In addition, for example, as shown in FIG. 7, the drive command signal may be rectified to a quadruple voltage by a quadruple voltage rectifier circuit 115k and supplied to the base of the first transistor 115n. The quadruple voltage rectifier circuit 115k includes four capacitors and four diodes.

Figure 8:
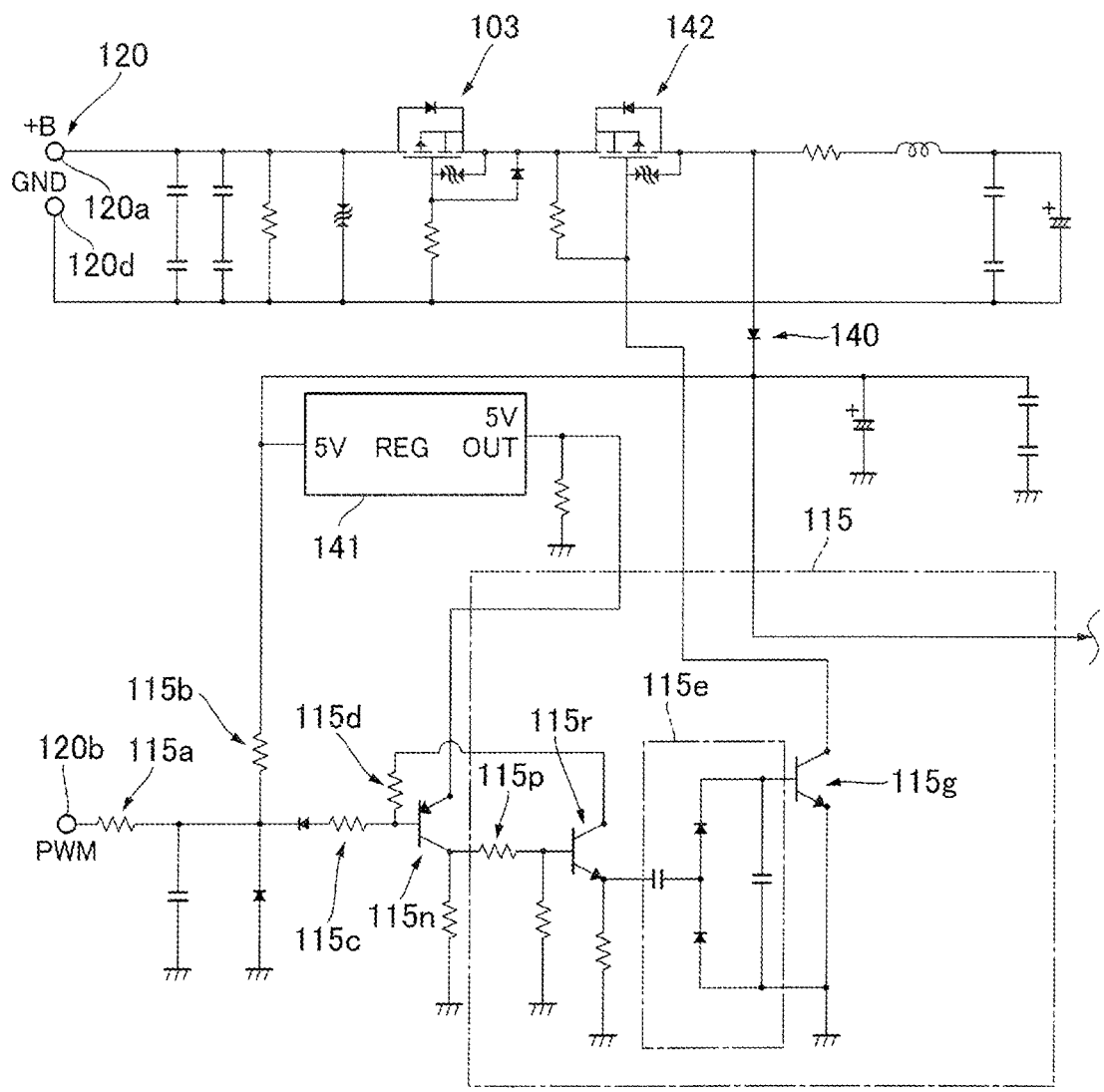
FIG. 8 is a circuit diagram showing a portion of the circuit in the electronic board of the electric oil pump according to the third modified example.

The above illustrates an example that the motor drive circuit 105 and the MOSFET 115i serving as the switching element for turning on and off the power supply to the microcomputer 114 are provided in the drive command detection circuit 115. However, the switching element may be provided on the upstream side of the drive command detection circuit 115. For example, as shown in FIG. 8, a MOSFET 142 serving as a switching element may be provided on the upstream side of the motor drive circuit 105 and the diode 140 connected to the microcomputer 114.

(1) The electronic board 101 of the electric oil pump 1 includes the board 102. The electronic board 101 includes the power input part 120 that inputs the power output from the in-vehicle battery 901, and the motor drive circuit 105 for driving the motor 11 serving as a drive source. In addition, the electronic board 101 includes the microcomputer 114 serving as a controller controlling the driving of the motor 11 performed by the motor drive circuit 105, and the signal input terminal 120b serving as a drive command signal input part inputting the drive command signal transmitted from the external ECU 900. Further, the electronic board 101 includes the drive command detection circuit 115, and the 5V power supply circuit 141 serving as a voltage varying part. The drive command detection circuit 115 is capable of detecting the drive command signal, and controls whether to supply the power input to the power input part 120 to the microcomputer 114 based on whether the drive command signal is detected. In addition, the 5V power supply circuit 141 varies the voltage from the power input part 120 and outputs the voltage to the drive command detection circuit 115.

In such a configuration, when the drive command signal transmitted from the ECU 900 is not detected, that is, when the motor 11 is not driven, the drive command detection circuit 115 stops the supply of power to the microcomputer 114 so as to suppress the generation of a dark current. Therefore, in the electric oil pump 1, it is possible to suppress the generation of a dark current without providing the vehicle with a relay that turns on and off the supply of the power output from the in-vehicle battery 901 to the electronic board 101. Thus, according to the electric oil pump 1, it is possible to suppress the generation of a dark current while avoiding a reduction in layout flexibility of the vehicle and an increase in cost caused by providing a relay in the vehicle. Further, according to the electric oil pump 1, it is possible to prevent the devices on the electronic board 101 from being damaged by a high voltage surge generated by the relay.

According to the electric oil pump 1, the 5V power supply circuit 141 is able to operate the drive command detection circuit 115 at a voltage (5V) different from that of the in-vehicle battery. Moreover, according to the electric oil pump 1, it is possible to supply power to the sensors, such as the rotation angle sensor 15, mounted on the electric oil pump 1 even when the motor 11 is not driven, so as to quickly start the motor 11 when the driving of the motor 11 starts.

(2) The drive command detection circuit 115 of the electronic board 101 controls whether to supply power input to the power input part 120 to the motor drive circuit 105 based on whether the drive command signal is detected. In other words, when the drive command signal transmitted from the ECU 900 is not detected, the drive command detection circuit 115 stops the power supply to the microcomputer 114 and also stops the power supply to the motor drive circuit 105, so as to suppress the generation of a dark current. Thus, according to the electric oil pump 1, it is possible to avoid a reduction in layout flexibility of the vehicle caused by providing a relay in the vehicle, and further suppress the generation of a dark current.

(3) The drive command detection circuit 115 of the electronic board 101 controls on/off of the switch of the MOSFET 115i arranged between the power input part 120 and the microcomputer 114. By such control, whether to supply the power of the in-vehicle battery 901 to the microcomputer 114 and whether to supply the power to the motor drive circuit 105 are controlled.

According to such a configuration, with a simple configuration of controlling the MOSFET 115i, it is possible to avoid a reduction in layout flexibility of the vehicle caused by providing a relay in the vehicle, and suppress the generation of a dark current.

(4) The electric oil pump 1 serving as an in-vehicle electric motor includes the motor part 10 that has the motor 11 serving as a drive source, the pump part 40 driven by the motor part 10, and the electronic board 101 controlling the driving of the motor 11. The electronic board 101 includes the drive command detection circuit 115.

According to the electric oil pump 1 having such a configuration, it is possible to suppress the generation of a dark current while avoiding a reduction in layout flexibility of the vehicle caused by providing a relay in the vehicle.

Features of the above-described preferred embodiments and the modifications thereof may be combined appropriately as long as no conflict arises. While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An electronic board, comprising a board and comprising on the board:
   a power input part inputting power output from an in-vehicle power supply, wherein the power input part comprises a terminal;
   a drive circuit driving a drive source;
   a controller controlling driving of the drive source performed by the drive circuit; and
   a drive command signal input part inputting a drive command signal transmitted from outside, wherein the drive command signal input part comprises a terminal,
   wherein the electronic board comprises on the board:
   a drive command signal detection circuit capable of detecting the drive command signal input from the drive command signal input part, and controlling whether to supply the power input to the power input part to the controller based on whether the drive command signal input from the drive command signal input part is detected; and
   a voltage varying part varying a voltage from the power input part and outputting a varied voltage to the drive command signal detection circuit, wherein the voltage varying part comprises a circuit.

2. The electronic board according to claim 1, wherein the drive command signal detection circuit controls whether to supply the power input to the power input part to the drive circuit based on whether the drive command signal is detected.

3. The electronic board according to claim 1, wherein the drive command signal detection circuit controls whether to supply the power to the controller and whether to supply the power to the drive circuit by controlling on/off of a switch of a switching element arranged between the power input part and the controller.

4. The electronic board according to claim 2, wherein the drive command signal detection circuit controls whether to supply the power to the controller and whether to supply the power to the drive circuit by controlling on/off of a switch of a switching element arranged between the power input part and the controller.

5. An in-vehicle electric motor, comprising:
   a drive source; and
   the electronic board according to claim 1.

6. An electric pump to be mounted on a vehicle, comprising:
   a drive source;
   a pump part driven by the drive source; and
   the electronic board according to claim 1.

* * * * *